Patented Nov. 25, 1930

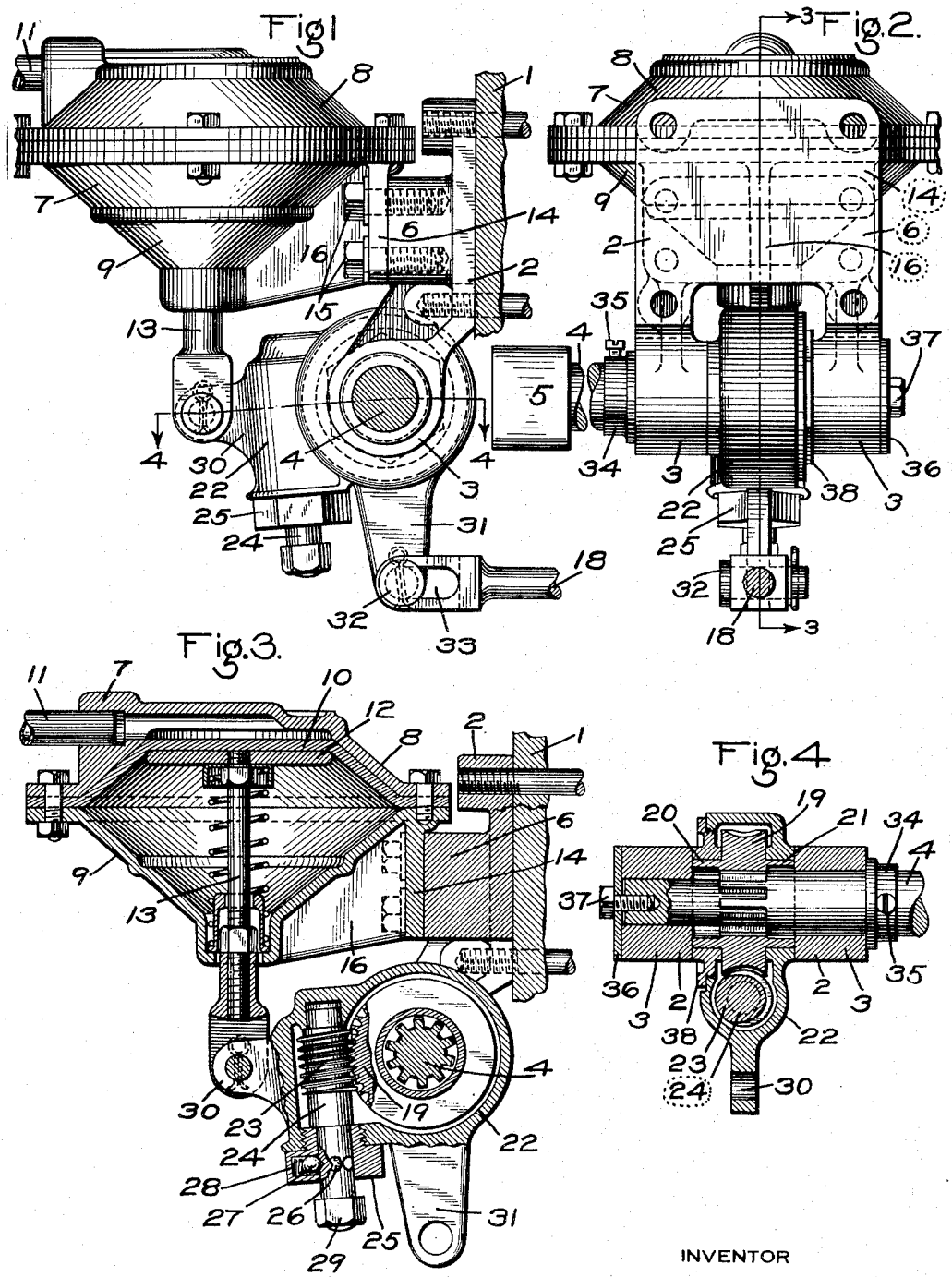

1,782,571

UNITED STATES PATENT OFFICE

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE DEVICE

Application filed May 9, 1927. Serial No. 189,752.

This invention relates to brakes and more particularly to motor vehicle brakes and has for an object the provision of novel means of mounting the diaphragm brake chamber and associated parts of the brake.

Another object of my invention is to provide a unitary construction combining a power and hand brake control with a slack adjuster.

These and other objects and advantages will appear from the following description.

Referring to the drawing, in which like reference characters refer to like parts, Fig. 1 is a side elevational view of a portion of the brake constructed in accordance with the invention, the cam shaft being shown in section; Fig. 2 is a rear elevational view of the same, a portion of the vehicle on which the brake is mounted being omitted; Fig. 3 is a sectional view taken on the line 3—3 of Fig. 2, a portion of the vehicle to which the brake is applied being shown; and Fig. 4 is a sectional view taken on the line 4—4 of Fig. 1.

Referring now in detail to the drawing, the reference character 1 indicates a portion of a motor vehicle, which in the present embodiment of the invention is the axle housing, but may be any other suitable part of the vehicle. Secured to the housing 1, there is a bracket member 2 having its lower end portion made in the form of spaced bearings 3 in which a cam shaft 4 is rotatably mounted, one end of said shaft being provided with a cam 5 which, upon rotation of the shaft 4, is adapted to effect the operation of the usual brake parts (not shown).

Above the bearing portions 3, the bracket member 2 is provided with an outwardly extending pad or projection 6, which is adapted to support a diaphragm brake chamber 7, comprising casing sections 8 and 9 having a flexible diaphragm 10 clamped between the flanges thereof. A fluid pressure supply and exhaust pipe 11 is connected to the chamber at one side of the diaphragm 10, and a pressure plate 12 engages the diaphragm at the other side. A rod 13 is secured to the plate 12 and extends through a central opening in the casing section 9.

The casing section 9 has a flange 14 which depends vertically from the clamping flange and is secured to the projection 6 of the bracket member 2 by bolts 15 or any other suitable securing means. To strengthen the flange 14 a vertically disposed rib 16 is provided which is integral with the flange 14 and the body portion of the casing section 9. It will here be noted that the construction of the casing section 9 is such that, by changing the bracket member 2 only, it may be adapted, without change, to various motor vehicle constructions. This is an important feature, for the reason that the construction of the diaphragm brake chamber may be made standard for any number of types of motor vehicles and may be properly mounted on these different types of vehicles through the medium of the bracket 2, altered to suit the construction of the particular type of vehicle to which the diaphragm brake chamber is to be applied, thus eliminating many structural difficulties which have heretofore been present.

For the purpose of taking up slack and for operatively connecting the rod 13, and a manually operable brake rod 18, with the cam shaft 4, a mechanism is provided, comprising a worm wheel 19 which is secured to the cam shaft 4 intermediate the spaced bearing portions 3 of the bracket 2, and has annular collars 20 and 21 projecting from the sides thereof, upon which a casing 22 is mounted and adapted to enclose a worm 23 on a shaft 24, rotatably mounted at one end in the casing, and adjacent the other end is rotatably mounted in a bushing 25 which has a screw-threaded connection with the casing. The end portion of the shaft 24, which is mounted in the bushing 25, is provided with a plurality of recesses 26, in any one of which, a ball 27, mounted in the bushing 25, is adapted to seat, such ball being forced outwardly at all times by a spring 28. This ball, when seated in any one of the recesses, will prevent accidental rotation of the shaft 24. When it is desired to adjust the brake, the shaft 24 is rotated, by means of a wrench or lever which may engage a nut 29 on the shaft 24. As the shaft is thus rotated the ball 27 will be automatically forced into and out of the recesses 26 so that the locking of the shaft 24 against accidental rotation is entirely automatic. The rotation of the worm 23 causes the worm wheel 19, cam shaft 4, and cam 5 to be rotated relative to the casing 22, thus shifting the angular position of the cam relative to the casing, so that the slack, due to the wear of the brake heads and brake drum, will be taken up.

The casing 22 is provided with an integral lever arm 30 which is operatively connected with the outer end of the rod 13, and is also provided with a lever arm 31 disposed at an angle to the arm 30, which arm 31 is operatively connected with one end of the manually operable brake rod 18 by a pin 32, which passes through the arm 31 and slots 33 formed in the end of the rod 18. This connection permits the casing 22 to be operated by fluid under pressure, without operating the manually operable brake rod 18.

For the purpose of holding the cam shaft against accidental longitudinal movement in one direction, a collar 34 is adjustably secured to the shaft by a set screw 35, and adapted to engage one of the bearing portions 3 of the bracket 2, and to prevent movement in the opposite direction, there is a member 36 secured to the shaft by a bolt 37, and adapted to engage the other of the bearing portions 3 of the bracket 2.

One side of the casing 22 comprises a bushing 38 which has a screw-threaded connection with the side portion of the casing. This bushing is adapted to close an opening in the casing, which opening is slightly greater in diameter than the diameter of the worm wheel 19 and is adapted to form a bearing for the collar 20 thereof. It will be noted that with this construction the worm wheel and casing 22 may be assembled preparatory to mounting them between the bearing portions 3 of the bracket 2 and further the shaft 24 and associated parts may also be assembled with the casing preparatory to mounting the casing on the cam shaft. It will thus be seen that the combined slack adjuster and brake lever may be assembled and applied to the brake as a unit.

Having now described my invention, what I claim as new and desire to secure by Letters Patent, is:—

1. In a motor vehicle brake, the combination with a rotatable brake applying shaft, of a bracket for supporting said shaft, a worm wheel secured to said shaft, collars projecting from the sides of said worm wheel, a member mounted on said collars and enclosing said worm wheel, a rotatable worm mounted in said member and meshing with said worm wheel, and a lever arm through which said member is operated to rotate said shaft.

2. In a motor vehicle brake, the combination with a rotatable brake applying shaft, of a bracket for supporting said shaft, a worm wheel secured to said shaft, collars projecting from the sides of said worm wheel, a member mounted on said collars and enclosing said worm wheel, a rotatable worm mounted in said member and meshing with said worm wheel, and forming an operative connection between said shaft and member, and a plurality of lever arms integral with said member through which said member is adapted to be operated to rotate said shaft.

3. In a motor vehicle brake, the combination with a rotatable brake applying shaft, of a bracket for supporting said shaft, a worm wheel secured to said shaft, collars projecting from the sides of said worm wheel, a member mounted on said collars and enclosing said worm wheel, a rotatable worm mounted in said member and meshing with said worm wheel, and forming an operative connection between said shaft and member, a plurality of lever arms integral with said member, fluid pressure means connected with one of said lever arms and operative to rotate said shaft to apply the brakes, and manually operable means connected with the other of said lever arms to rotate the shaft and apply the brakes.

4. In a motor vehicle brake, the combination with a rotatable brake applying shaft, of a manually operable brake rod, a fluid pressure operated rod, a member operatively connecting both of said rods with said shaft, means associated with said member for adjusting the angular position of said shaft relative to said member, and means operable automatically for maintaining the adjustment of said shaft.

In testimony whereof I have hereunto set my hand.

HENRY D. HUKILL.